US011051145B2

(12) United States Patent
Mizutani et al.

(10) Patent No.: US 11,051,145 B2
(45) Date of Patent: Jun. 29, 2021

(54) INFORMATION PROVIDING SYSTEM, SERVER, AND INFORMATION PROVIDING METHOD

(71) Applicant: TOYOTA JIDOSHA KABUSHIKI KAISHA, Toyota (JP)

(72) Inventors: Atsushi Mizutani, Toyota (JP); Daiki Kaneichi, Nisshin (JP); Hirotaka Karube, Toyota (JP); Jun Kondo, Nisshin (JP); Kenichi Komuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/174,473

(22) Filed: Oct. 30, 2018

(65) Prior Publication Data
US 2019/0132719 A1 May 2, 2019

(30) Foreign Application Priority Data

Nov. 1, 2017 (JP) .............................. JP2017-212083

(51) Int. Cl.
*H04W 4/44* (2018.01)
*G08G 1/00* (2006.01)
(Continued)

(52) U.S. Cl.
CPC .............. *H04W 4/44* (2018.02); *B60L 53/14* (2019.02); *B60L 53/32* (2019.02); *B60L 53/36* (2019.02);
(Continued)

(58) Field of Classification Search
CPC ...... H04W 4/44; B60L 11/1816; B60L 53/14; B60L 53/32; B60L 53/36; B60L 53/60;
(Continued)

(56) References Cited

U.S. PATENT DOCUMENTS

2011/0025267 A1* 2/2011 Kamen .................. B60L 8/003
320/109
2012/0109409 A1 5/2012 Hara
(Continued)

FOREIGN PATENT DOCUMENTS

JP 2005050183 A 2/2005
JP 2012108870 A 6/2012
(Continued)

OTHER PUBLICATIONS

United States Patent and Trademark Office, Non-Final Office Action issued to U.S. Appl. No. 16/174,836 dated Jun. 10, 2020, 21 pages.
(Continued)

*Primary Examiner* — Benjamin M Thieu
(74) *Attorney, Agent, or Firm* — Hunton Andrews Kurth LLP

(57) ABSTRACT

An information providing system includes a server, a plurality of power-supplying vehicles, and a plurality of power-receiving vehicles. Each power-supplying vehicle is configured to transmit power-supplying permission information to the server, the power-supplying permission information indicating current location and possible power-supplying amount of the power-supplying vehicle. Each power-receiving vehicle is configured to transmit power-receiving request information to the server, the power-receiving request information indicating current location and requested power-receiving amount of the power-receiving vehicle. The server is configured to: determine vehicles to be matched and a gathering location of the vehicles using the power-supplying permission information (current location and possible power-supplying amount) of the power-supplying vehicle and the power-receiving request information (current location and requested power-receiving amount) of the power-
(Continued)

receiving vehicle; and transmit the determined gathering location to the matched vehicles.

7 Claims, 15 Drawing Sheets

(51) Int. Cl.
    *G05D 1/00* (2006.01)
    *B60L 53/14* (2019.01)
    *B60L 53/60* (2019.01)
    *B60L 53/30* (2019.01)
    *B60L 53/36* (2019.01)
    *H02J 7/34* (2006.01)
    *G08G 1/13* (2006.01)

(52) U.S. Cl.
    CPC ............ B60L 53/60 (2019.02); G05D 1/0088 (2013.01); G08G 1/205 (2013.01); H02J 7/342 (2020.01); *B60L 2240/62* (2013.01); *G08G 1/13* (2013.01)

(58) Field of Classification Search
    CPC .. B60L 2240/62; G05D 1/0088; G08G 1/205; G08G 1/13; G08G 1/202; H02J 7/0054; G01C 21/3438
    See application file for complete search history.

(56) References Cited

U.S. PATENT DOCUMENTS

| | | |
|---|---|---|
| 2012/0271758 A1 | 10/2012 | Jammer |
| 2013/0035823 A1* | 2/2013 | Yoshida ................. B60L 50/53 701/31.5 |
| 2013/0204471 A1 | 8/2013 | O'Connell et al. |
| 2014/0188318 A1 | 7/2014 | Langgood et al. |
| 2014/0278104 A1* | 9/2014 | Proietty ............. G01C 21/3438 701/537 |
| 2018/0265293 A1* | 9/2018 | Zuckerman ............ G06Q 10/08 |
| 2019/0128684 A1 | 5/2019 | Mizutani et al. |
| 2019/0135133 A1* | 5/2019 | Miller ................... B60L 53/305 |
| 2019/0351783 A1* | 11/2019 | Goei ....................... B60L 53/68 |
| 2019/0375306 A1* | 12/2019 | Ambrosetti ............. H02J 7/025 |

FOREIGN PATENT DOCUMENTS

| | | | |
|---|---|---|---|
| JP | 2012128587 A | | 7/2012 |
| JP | 2012-207941 A | | 10/2012 |
| JP | 2013115873 A | * | 6/2013 |
| JP | 2013115873 A | | 6/2013 |
| JP | 2013-130963 A | | 7/2013 |
| JP | 2013-192285 A | | 9/2013 |
| JP | 2015075820 A | | 4/2015 |
| KR | 20170034477 A | | 3/2017 |

OTHER PUBLICATIONS

Notice of Allowance, United States Patent and Trademark Office issued to U.S. Appl. No. 16/174,836 dated Nov. 3, 2020, 13 pages.
United States Patent and Trademark Office, Supplemental Notice of Allowability, issued to U.S. Appl. No. 16/174,836 dated Jan. 25, 2021, 6 pages.

* cited by examiner

FIG.10

|  | DISTANCE FROM POWER-RECEIVING VEHICLE | POWER AMOUNT DIFFERENCE (=Eout-Ereq) | CANDIDATE PRIORITY |
|---|---|---|---|
| POWER-SUPPLYING PERMITTED VEHICLE A | L1 | $\alpha$ | 2 |
| POWER-SUPPLYING PERMITTED VEHICLE B | L2 | 0 | 1 |
| POWER-SUPPLYING PERMITTED VEHICLE C | L3 | $\alpha$ | 3 |
| POWER-SUPPLYING PERMITTED VEHICLE D | L4 | $2\alpha$ | 4 |

L1<L2<L3<L4<Lth    $\alpha$>0

CANDIDATE POWER-SUPPLYING VEHICLE

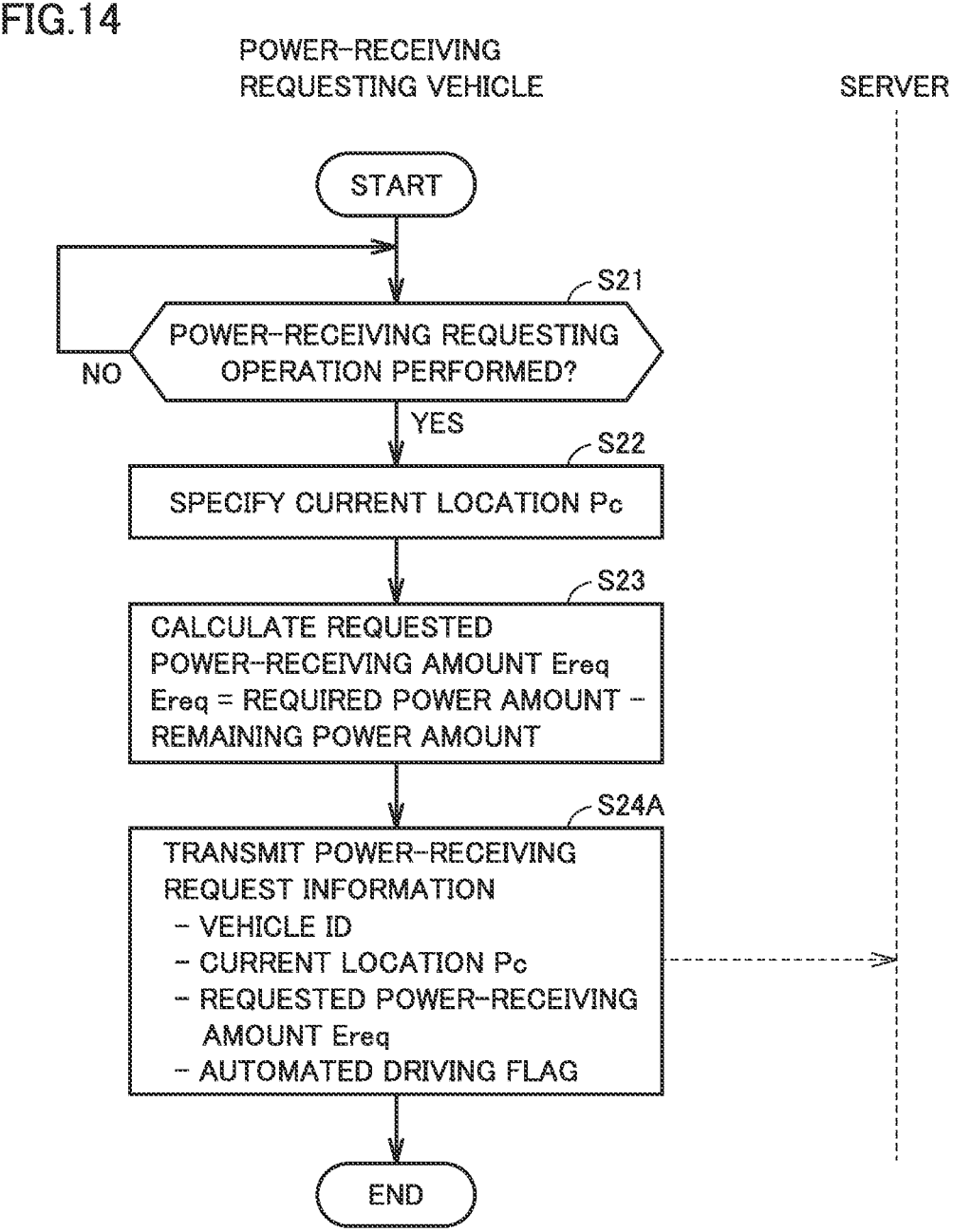

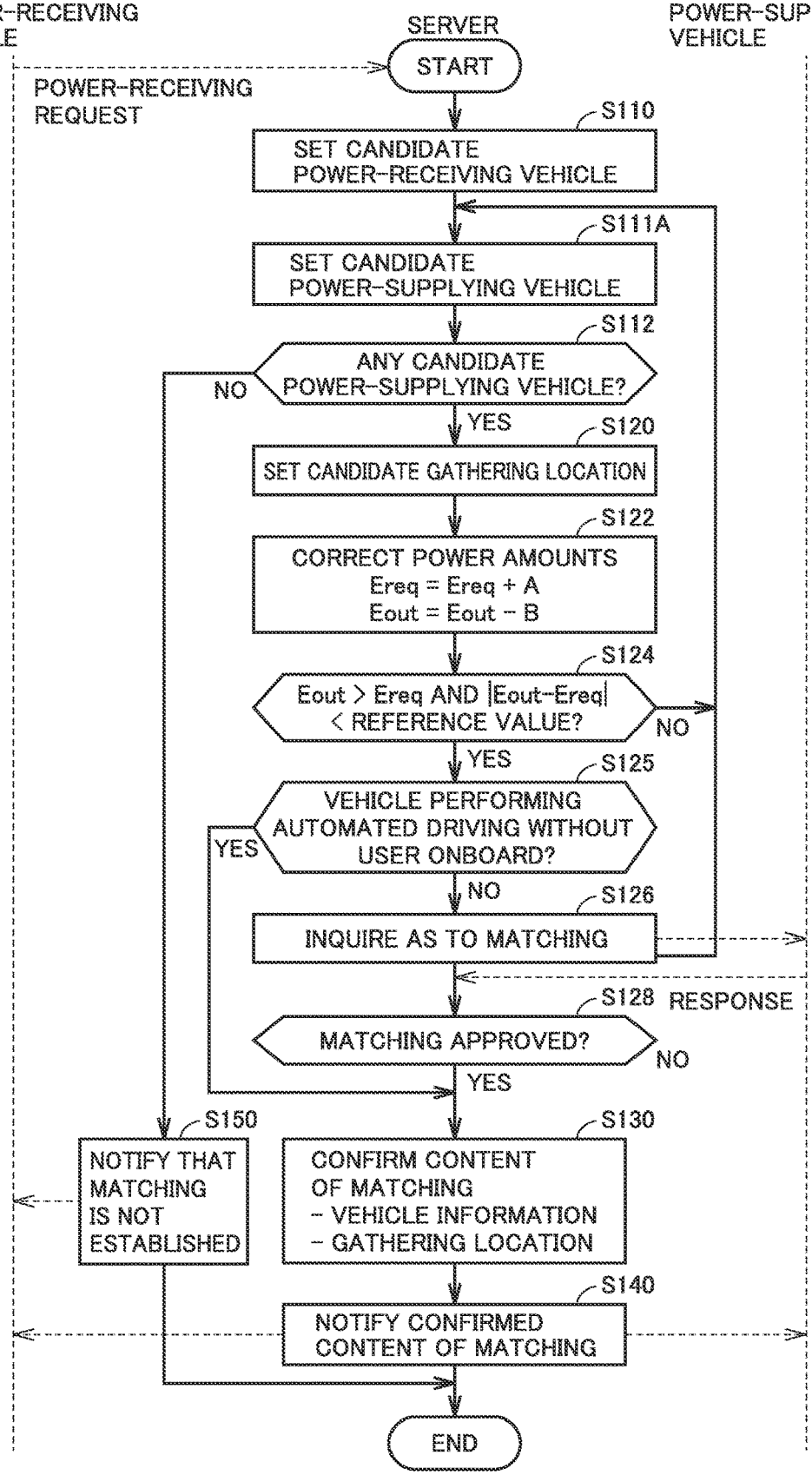

INFORMATION PROVIDING SYSTEM, SERVER, AND INFORMATION PROVIDING METHOD

This nonprovisional application is based on Japanese Patent Application No. 2017-212083 filed on Nov. 1, 2017, with the Japan Patent Office, the entire contents of which are hereby incorporated by reference.

BACKGROUND

Field

The present disclosure relates to system and method for providing information to an electrically powered vehicle, as well as a server used therefor.

Description of the Background Art

Japanese Patent Laying-Open No. 2013-130963 discloses a charging system that provides a service for aiding to charge an electrically powered vehicle that needs to be charged. This charging system includes a server and a plurality of electrically powered vehicles. The server verifies information of a power-receiving requesting vehicle having requested charging against information of vehicles capable of supplying power and having transmitted indications that they are capable of supplying power to another vehicle, selects a power-supplying performing vehicle that satisfies a required condition from the vehicles capable of supplying power, and provides information of the selected power-supplying performing vehicle to the power-receiving requesting vehicle.

SUMMARY

However, in the charging system disclosed in Japanese Patent Laying-Open No. 2013-130963, each of users of the power-supplying performing vehicle and the power-receiving requesting vehicle is unable to know an appropriate power amount to be exchanged between the vehicles. For example, if the power-supplying vehicle supplies too a large amount of power to the power-receiving vehicle, then the power-supplying vehicle can travel a shorter distance, with the result that the power-supplying vehicle may be unable to reach a destination. On the other hand, if the power-receiving vehicle receives too a small amount of power from the power-supplying vehicle, the power-receiving vehicle may be unable to reach a next destination (for example, a charging station or the like).

Further, in the charging system disclosed in Japanese Patent Laying-Open No. 2013-130963, the user of each vehicle is unable to know at which location it is appropriate to set a gathering location where the vehicles will be gathered. If the gathering location is not appropriate, a mismatch in power amount may arise due to both the vehicles moving to the gathering location.

The present disclosure has been made to solve the above-described problems, and has an object to notify, to respective users of a power-supplying vehicle and a power-receiving vehicle, a gathering location by which a mismatch in power amount between the power-supplying vehicle and the power-receiving vehicle can be suppressed.

(1) An information providing system according to the present disclosure includes: a server; a plurality of power-supplying vehicles configured to transmit respective pieces of first information to the server, the respective pieces of first information indicating respective current locations and respective possible power-supplying amounts of the plurality of power-supplying vehicles; and a plurality of power-receiving vehicles configured to transmit respective pieces of second information to the server, the respective pieces of second information indicating respective current locations and respective requested power-receiving amounts of the plurality of power-receiving vehicles. The server is configured to perform a matching process for matching at least one of the plurality of power-supplying vehicles and at least one of the plurality of power-receiving vehicles using the respective pieces of first information and the respective pieces of second information and for determining a gathering location of the matched vehicles. The server is configured to transmit information indicating the determined gathering location to the matched vehicles.

According to the above-described configuration, the server determines the vehicles to be matched and the gathering location thereof in consideration of the current location and possible power-supplying amount (first information) of the power-supplying vehicle and the current location and requested power-receiving amount (second information) of the power-receiving vehicle. Accordingly, the server can determine, as the gathering location, a location by which a mismatch in power amount between the matched vehicles can be suppressed. Then, the server transmits the determined gathering location to the matched vehicles. Accordingly, the users of both the vehicles can be notified of the gathering location by which the mismatch in power amount between the power-supplying vehicle and the power-receiving vehicle can be suppressed.

(2) In a certain embodiment, in the matching process, the server is configured to: set at least one of the plurality of power-supplying vehicles as a candidate power-supplying vehicle, and set at least one of the plurality of power-receiving vehicles as a candidate power-receiving vehicle; and set a candidate gathering location of the candidate power-supplying vehicle and the candidate power-receiving vehicle using a current location of the candidate power-supplying vehicle, a current location of the candidate power-receiving vehicle, and map information. Further, the server is configured to determine whether to match the candidate power-supplying vehicle and the candidate power-receiving vehicle, using: a value obtained by subtracting a power amount required by the candidate power-supplying vehicle to move to the candidate gathering location from a possible power-supplying amount of the candidate power-supplying vehicle; and a value obtained by adding a power amount required by the candidate power-receiving vehicle to move to the candidate gathering location to a requested power-receiving amount of the candidate power-receiving vehicle.

According to the above-described configuration, in the matching process, the server can determine whether to match the candidate power-supplying vehicle and the candidate power-receiving vehicle, in consideration of the power amount required by the candidate power-supplying vehicle to move to the candidate gathering location and the power amount required by the candidate power-receiving vehicle to move to the candidate gathering location. Hence, the mismatch in power amount can be suppressed appropriately from arising due to both the matched vehicles moving to the gathering location.

(3) In a certain embodiment, each of the plurality of power-supplying vehicles and the plurality of power-receiving vehicles includes a power storage device. Each power-supplying vehicle is configured to transmit, to the server as the possible power-supplying amount, a value obtained by subtracting a power amount required to move from a current location of the power-supplying vehicle to a target location from a stored power amount of the power storage device of the power-supplying vehicle. Each power-receiving vehicle is configured to transmit, to the server as the requested power-receiving amount, a value obtained by subtracting a stored power amount of the power storage device of the power-receiving vehicle from a power amount required to move from a current location of the power-receiving vehicle to a target location.

According to the above-described configuration, in the matching process, the server can determine whether to match the candidate power-supplying vehicle and the candidate power-receiving vehicle in consideration of the power amount required by the power-supplying vehicle to move to the target location and the power amount required by the power-receiving vehicle to move to the target location. Accordingly, after exchanging power between the matched vehicles, respective power amounts required by the vehicles to move to respective target locations can be appropriately secured.

(4) In a certain embodiment, each of the plurality of power-supplying vehicles and the plurality of power-receiving vehicles is configured to transmit to the server an automated driving flag indicating whether or not automated driving is being performed. In the matching process, the server is configured to include, as a subject of the matching process, a vehicle determined to be performing automated driving in accordance with a corresponding automated driving flag.

According to the above-described configuration, the server can perform the matching process in consideration of whether or not each vehicle is performing automated driving.

(5) In a certain embodiment, in the matching process, the server is configured to match a power-receiving vehicle not determined to be performing automated driving in accordance with a corresponding automated driving flag, and a power-supplying vehicle determined to be performing automated driving in accordance with a corresponding automated driving flag.

According to the above-described configuration, the server can match the candidate power-supplying vehicle that is performing automated driving and that has a larger degree of freedom in operation, to the power-receiving vehicle that is being driven by the user and that has a smaller degree of freedom in operation.

(6) A server according to the present disclosure is configured to communicate with a plurality of power-supplying vehicles and a plurality of power-receiving vehicles. The server includes: a communicator configured to obtain respective pieces of first information from the plurality of power-supplying vehicles and obtain respective pieces of second information from the plurality of power-receiving vehicles, the respective pieces of first information indicating respective current locations and respective possible power-supplying amounts of the plurality of power-supplying vehicles, the respective pieces of second information indicating respective current locations and respective requested power-receiving amounts of the plurality of power-receiving vehicles; and a controller connected to the communicator. The controller is configured to: perform a matching process for matching at least one of the plurality of power-supplying vehicles and at least one of the plurality of power-receiving vehicles using the respective pieces of first information and the respective pieces of second information and for determining a gathering location of the matched vehicles; and transmit information indicating the determined gathering location to the matched vehicles.

(7) An information providing method according to the present disclosure is an information providing method performed by an information providing system including a plurality of power-supplying vehicles, a plurality of power-receiving vehicles, and a server configured to communicate with the plurality of power-supplying vehicles and the plurality of power-receiving vehicles. The information providing method includes: obtaining respective pieces of first information from the plurality of power-supplying vehicles, the respective pieces of first information indicating respective current locations and respective possible power-supplying amounts of the plurality of power-supplying vehicles; obtaining respective pieces of second information from the plurality of power-receiving vehicles, the respective pieces of second information indicating respective current locations and respective requested power-receiving amounts of the plurality of power-receiving vehicles; performing a matching process for matching at least one of the plurality of power-supplying vehicles and at least one of the plurality of power-receiving vehicles using the respective pieces of first information and the respective pieces of second information and for determining a gathering location of the matched vehicles; and transmitting information indicating the determined gathering location to the matched vehicles.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 illustrates an exemplary method of setting a candidate power-supplying vehicle.

FIG. 14 is a second flowchart showing an exemplary detailed procedure of a process in which the power-receiving requesting vehicle transmits power-receiving request information to the server.

FIG. 15 is a second flowchart showing an exemplary detailed procedure of a matching process performed by the server.

DESCRIPTION OF THE PREFERRED EMBODIMENTS

Figure 1:
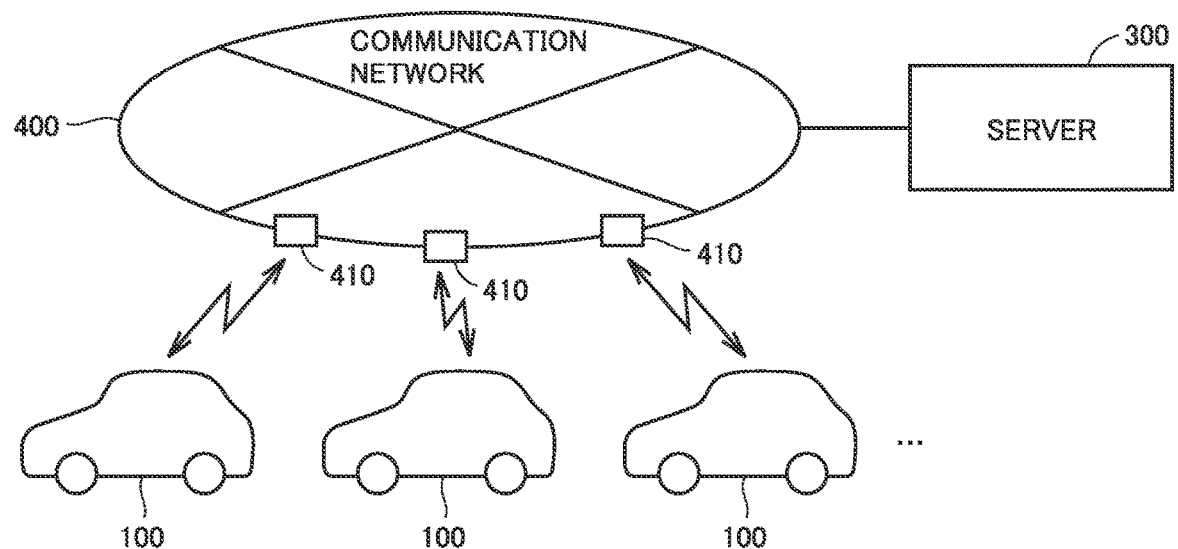
FIG. 1 schematically shows an entire configuration of an information providing system.

The following describes embodiments of the present disclosure with reference to figures in detail. It should be noted that the same or corresponding portions are given the same reference characters and are not described repeatedly.

First Embodiment

<System Configuration>

FIG. 1 schematically shows an entire configuration of an information providing system 10 according to the present embodiment. Information providing system 10 includes a plurality of electrically powered vehicles (hereinafter, also simply referred to as "vehicles") 100, and a server 300. Each vehicle 100 and server 300 are configured to communicate with each other via a communication network 400 such as the Internet or a telephone network. It should be noted that each vehicle 100 is configured to send and receive information to and from a base station 410 of communication network 400 through wireless communication.

As described below with reference to FIG. 2, vehicle 100 is an electric vehicle (EV) configured to generate driving power for traveling using electric power from a power storage device mounted thereon and to permit charging of the power storage device using electric power supplied from a power supply external to the vehicle.

Server 300 communicates with vehicle 100 and provides vehicle 100 with information about other vehicles.

Figure 2:
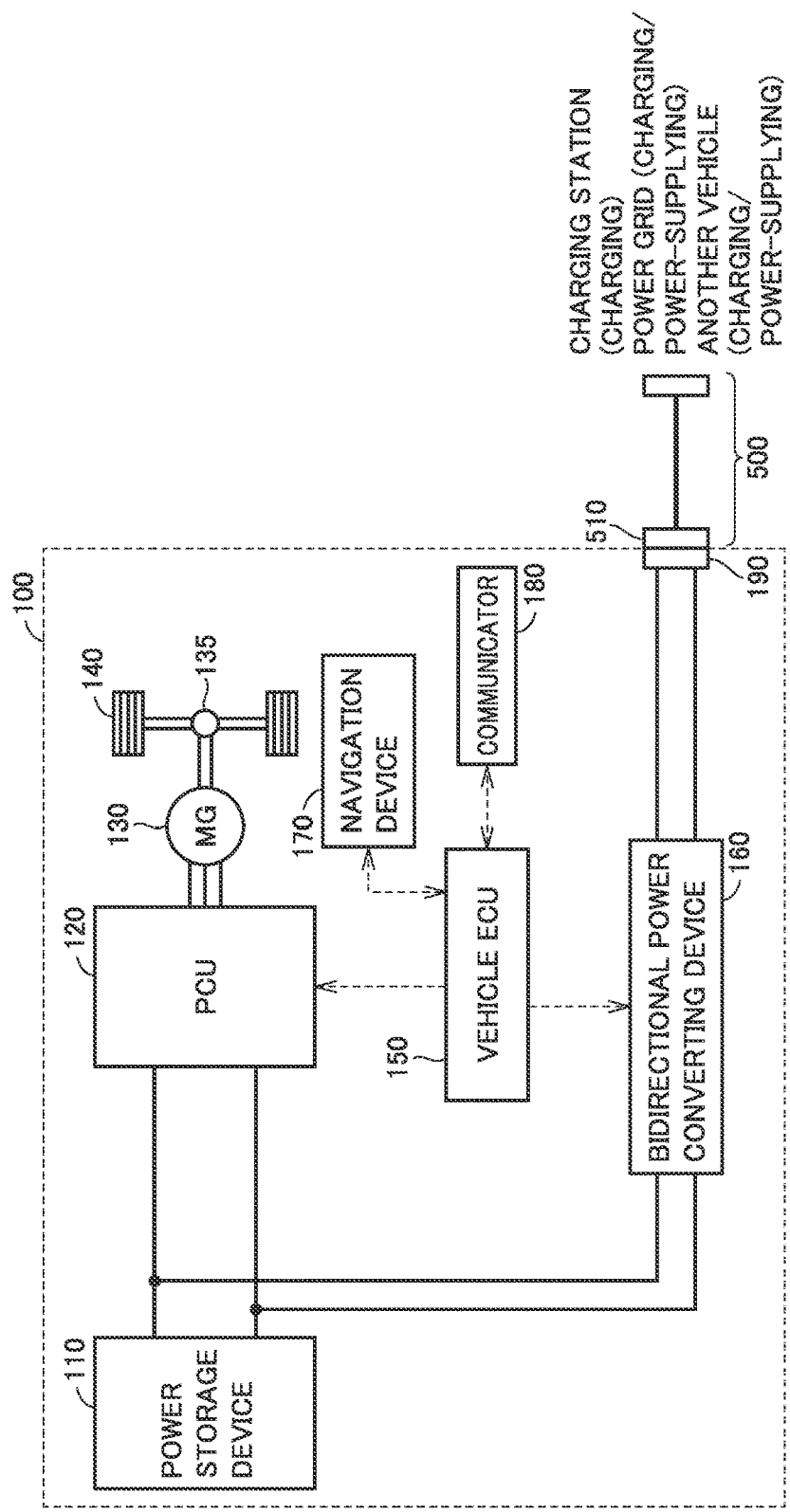
FIG. 2 is a first diagram showing an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using power supplied from a charging station or commercial power grid external to the vehicle. Moreover, vehicle 100 can output power of power storage device 110 to outside the vehicle, and can perform "inter-vehicle charging", which is charging and discharging between vehicle 100 and another vehicle.

Figure 3:
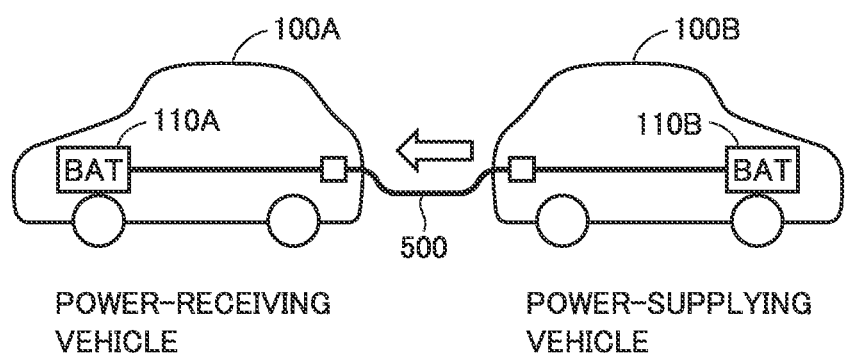
FIG. 3 illustrates inter-vehicle charging.

FIG. 3 illustrates the inter-vehicle charging. For the inter-vehicle charging, as shown in FIG. 3, a vehicle 100 (hereinafter, also referred to as "power-receiving vehicle 100A") to receive power and a vehicle 100 (hereinafter, also referred to as "power-supplying vehicle 100B") to supply power are connected to each other via a charging cable 500. Then, power is discharged from a power storage device 110B of power-supplying vehicle 100B to charge a power storage device 110A of power-receiving vehicle 100A.

Turning back to FIG. 2, power storage device 110 is configured to be charged and discharged. Power storage device 110 is configured to include a secondary battery such as a lithium ion battery or a nickel-hydrogen battery, or include a power storage element such as an electric double layer capacitor, for example.

Power storage device 110 supplies electric power to PCU 120 so as to generate driving power of vehicle 100. Further, power storage device 110 stores electric power generated by motor generator 130. Power storage device 110 outputs, to vehicle ECU 150, detection values of voltage and current of power storage device 110 detected by a sensor not shown in the figure.

PCU 120 is configured to include power converting devices such as a converter and an inverter, which are not shown in the figure. Each of the converter and the inverter is controlled by a control signal from vehicle ECU 150 to convert DC power from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

As a configuration for charging and discharging power storage device 110, vehicle 100 further includes a bidirectional power converting device 160, a communicator 180, and an inlet 190. A charging connector 510 of charging cable 500 is connected to inlet 190. Via charging cable 500, power supplied from another vehicle is transferred to vehicle 100.

Bidirectional power converting device 160 is connected between power storage device 110 and inlet 190. Bidirectional power converting device 160 is controlled by a control signal from vehicle ECU 150 to convert power supplied from another vehicle or the like into power with which power storage device 110 can be charged.

Moreover, bidirectional power converting device 160 converts power from power storage device 110 into power that can be output to outside the vehicle.

Communicator 180 is an interface for communication between vehicle ECU 150 and server 300 external to the vehicle or another vehicle. As described above, communicator 180 is configured to communicate with server 300 via communication network 400.

Figure 4:
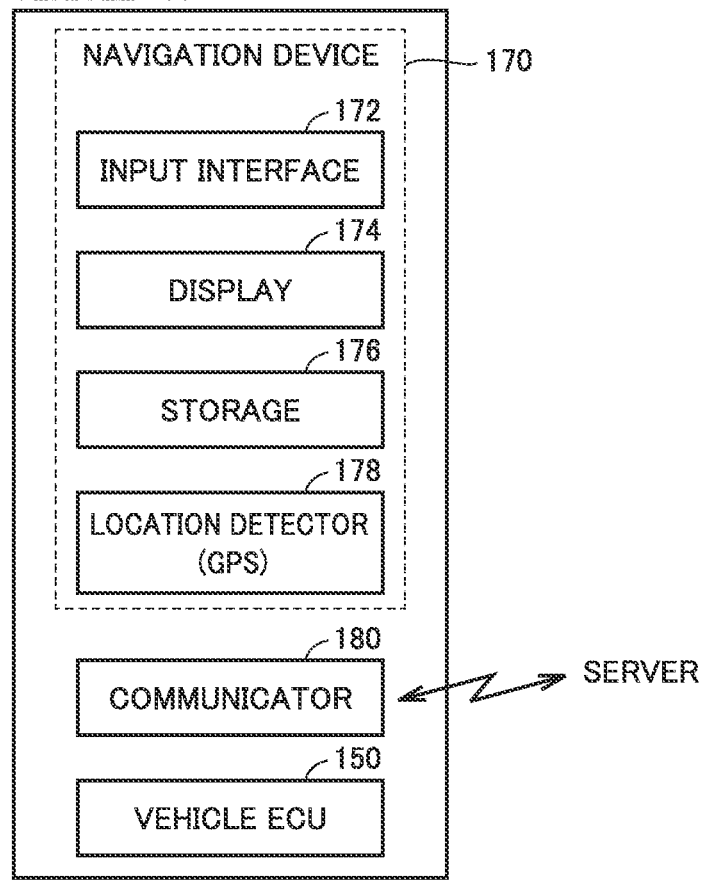
FIG. 4 is a block diagram showing a configuration in relation with a navigation device in the vehicle.

FIG. 4 is a block diagram showing a configuration in relation with navigation device 170 in vehicle 100. Navigation device 170 includes an input interface 172, a display 174, a storage 176, and a location detector 178 as shown in FIG. 4. Navigation device 170 uses map information stored in storage 176 and location information of vehicle 100 detected by GPS (Global Positioning System) of location detector 178, so as to present the current location of vehicle 100 on a map for the user and provide a navigation to a destination.

Display 174 is constructed of, for example, a liquid crystal panel and presents the current location of vehicle 100 or various information from vehicle ECU 150. Input interface 172 is constructed of a touch panel, a switch, or the like, and receives an operation by the user.

Figure 5:
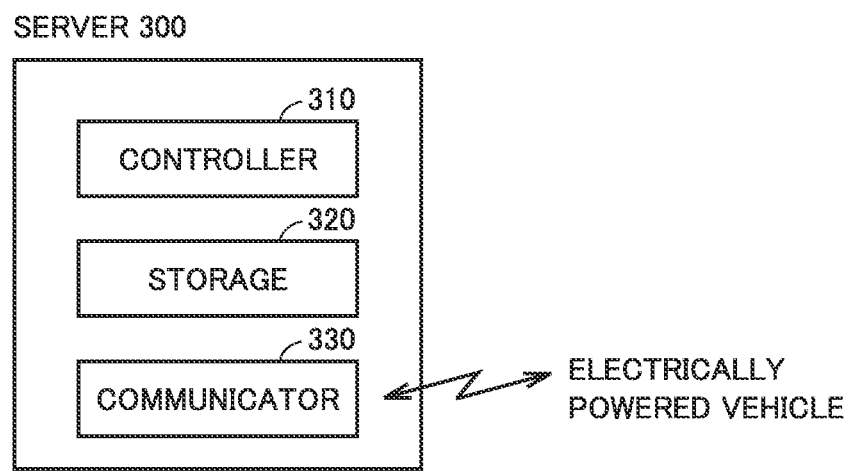
FIG. 5 is a block diagram showing a configuration of a server.

FIG. 5 is a block diagram showing a configuration of server 300. Server 300 includes a controller 310, a storage 320, and a communicator 330.

Communicator 330 is an interface for communication with vehicle 100 via communication network 400. In storage 320, the map information and the information (location information or the like) received from vehicle 100 are stored.

Based on the information received from vehicle 100 by communicator 330 and the information stored in storage 320, controller 310 perform a matching process for vehicles that are to perform inter-vehicle charging as described below.

<Matching of Vehicles that are to Perform Inter-Vehicle Charging>

As described above, vehicle 100 can perform inter-vehicle charging, which is charging and discharging between vehicle 100 and another vehicle. Therefore, when a vehicle 100 (hereinafter, also referred to as "power-receiving requesting vehicle") having a power storage device 110 with a small remaining power amount and requesting reception of power from another vehicle can be matched to a vehicle 100 (hereinafter, also referred to as "power-supplying permitted vehicle") having a power storage device 110 with a large remaining power amount and permitted to supply power to another vehicle, electric energy stored in each vehicle 100 can be utilized effectively.

However, users of the vehicles do not known an appropriate power amount to be exchanged between the vehicles. For example, if the power-supplying permitted vehicle supplies too a large amount of power to the power-receiving requesting vehicle, then the power-supplying permitted vehicle can travel a shorter distance, with the result that the power-supplying permitted vehicle may be unable to reach a destination. On the other hand, if the power-receiving requesting vehicle receives too a small amount of power from the power-supplying permitted vehicle, the power-receiving vehicle may be unable to reach a next destination (for example, a charging station or the like).

Further, the users of the vehicles do not know where to set a location at which the vehicles will be gathered for the inter-vehicle charging. Power is consumed to move both the vehicles to the gathering location. Hence, if the gathering location is determined without consideration of a power amount required to move to the gathering location, a mismatch in power amount may arise due to the both vehicles moving to the gathering location. If such a mismatch arises, not only the inter-vehicle charging cannot be performed but also the power utilized by each of the vehicles to move to the gathering location is wasted.

In view of the above, information providing system 10 according to the first embodiment provides a service for: matching a power-supplying permitted vehicle and a power-receiving requesting vehicle on a map such that a power amount that can be supplied by the power-supplying permitted vehicle is substantially the same as a power amount requested by the power-receiving requesting vehicle; and notifying the content of the matching to each of the vehicles. Hereinafter, details of this service will be described.

Figure 6:
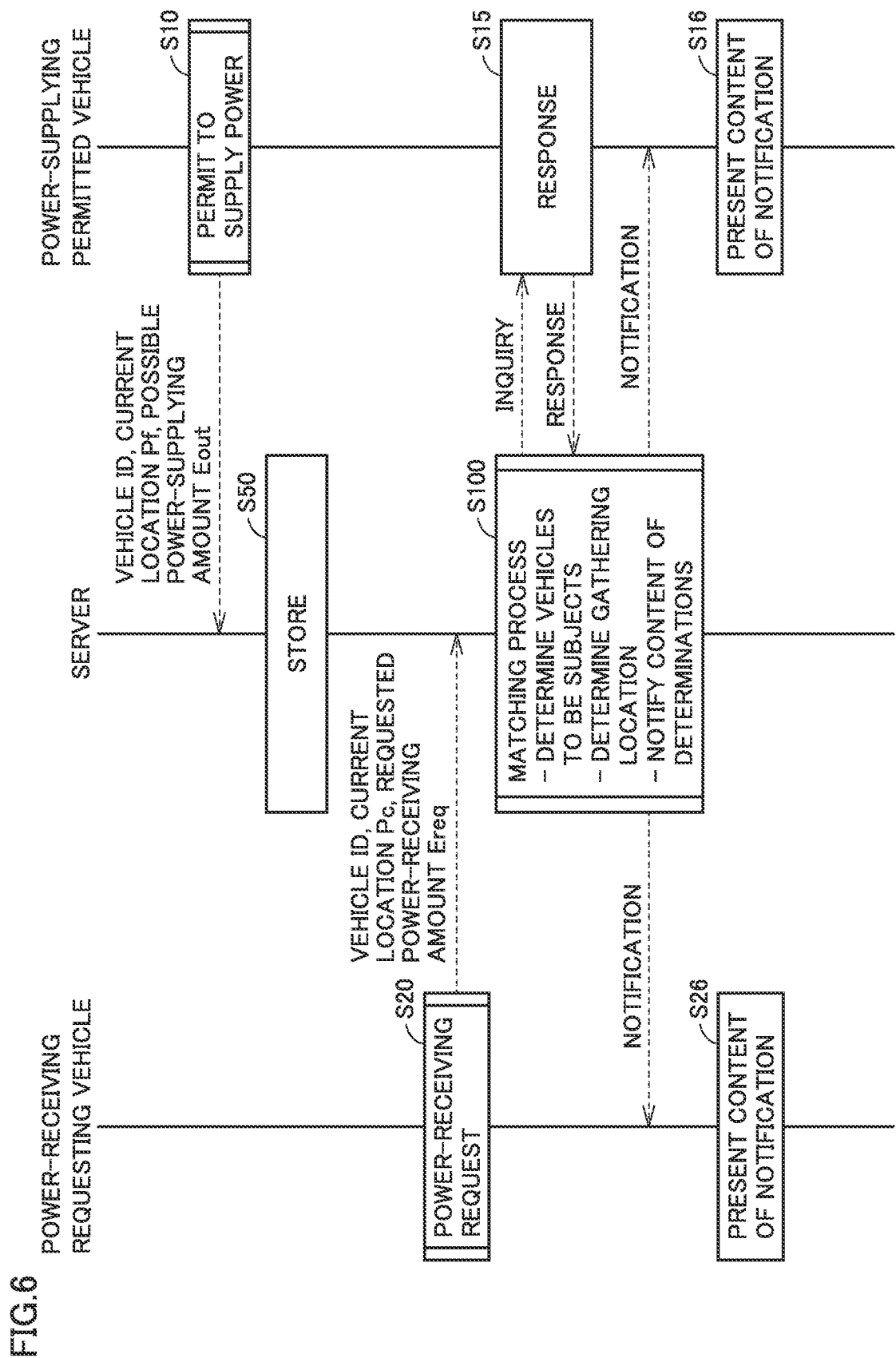
FIG. 6 is a first sequence diagram showing an exemplary process performed among a power-receiving requesting vehicle, the server, and a power-supplying permitted vehicle.

FIG. 6 is a sequence diagram showing an exemplary process among a power-receiving requesting vehicle (more specifically, vehicle ECU 150 of the power-receiving requesting vehicle), server 300 (more specifically, controller 310 of server 300), and a power-supplying permitted vehicle (more specifically, vehicle ECU 150 of the power-supplying permitted vehicle) included in information providing system 10. It should be noted that for simplicity of explanation, FIG. 6 illustrates one power-receiving requesting vehicle and one power-supplying permitted vehicle; however, there may be actually a plurality of power-receiving requesting vehicles and a plurality of power-supplying permitted vehicles.

When it is permitted in the power-supplying permitted vehicle to supply power to another vehicle, the power-supplying permitted vehicle transmits power-supplying permission information to server 300 (step S10). The power-supplying permission information includes information such as a vehicle ID for specifying the power-supplying permitted vehicle, a current location Pf of the power-supplying permitted vehicle, and a power amount (hereinafter, also referred to as "possible power-supplying amount") Eout that can be supplied. Server 300 stores, into storage 320, the power-supplying permission information received from the power-supplying permitted vehicle (step S50).

Figure 7:
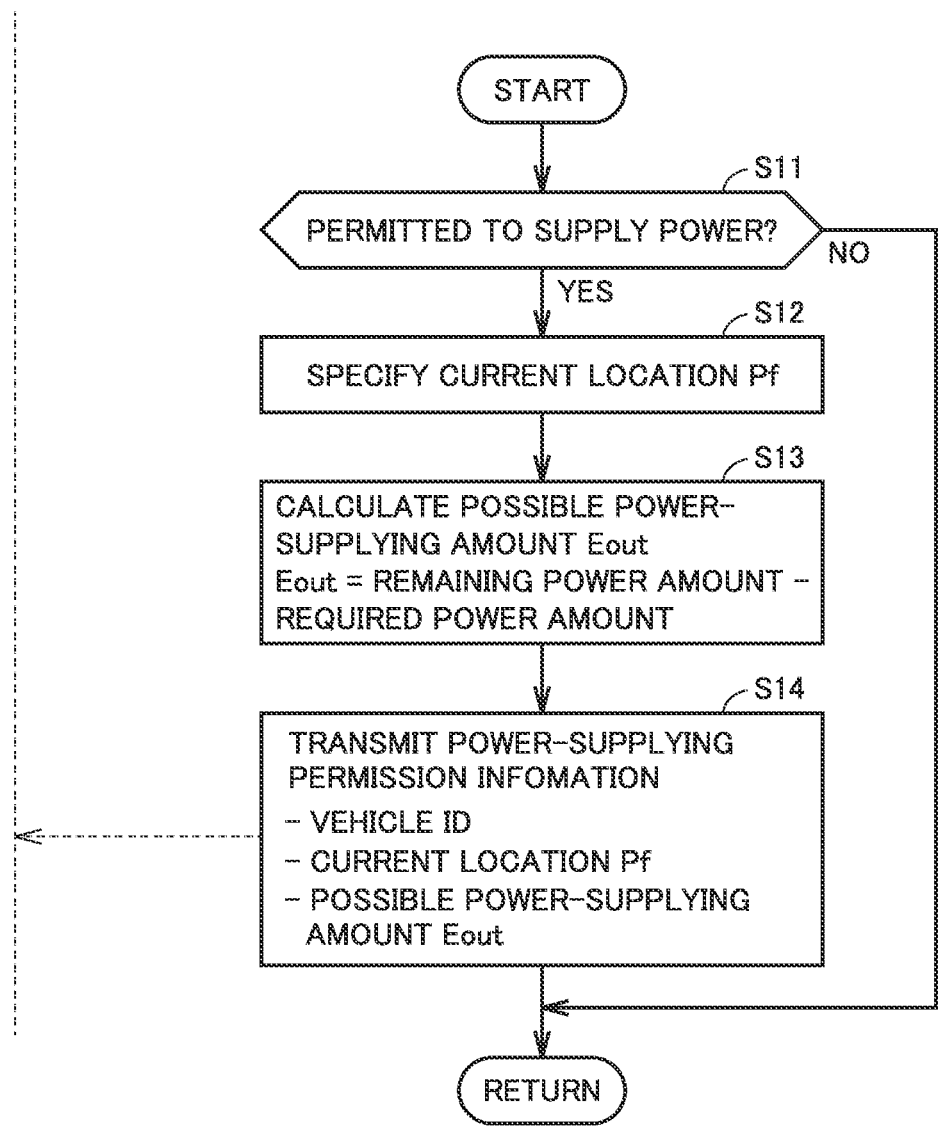
FIG. 7 is a first flowchart showing an exemplary detailed procedure of a process in which the power-supplying permitted vehicle transmits power-supplying permission information to the server.

FIG. 7 is a flowchart showing an exemplary detailed procedure of the process (step S10 of FIG. 6) in which the power-supplying permitted vehicle transmits the power-supplying permission information to server 300.

The power-supplying permitted vehicle determines whether or not it is permitted by the user to supply power to another vehicle (step S11). When it is not permitted to supply power to another vehicle (NO in step S11), the power-supplying permitted vehicle skips subsequent processes and brings the process to return.

When it is permitted to supply power to another vehicle (YES in step S11), the power-supplying permitted vehicle specifies current location Pf of the power-supplying permitted vehicle using GPS of location detector 178 (step S12).

Next, the power-supplying permitted vehicle calculates possible power-supplying amount Eout (step S13). In the present embodiment, the power-supplying permitted vehicle employs a known method to calculate a required power amount that is required to move from current location Pf to a target location, and calculates, as possible power-supplying amount Eout, a value obtained by subtracting the calculated required power amount from a power amount (remaining power amount) stored in power storage device 110. When the user has designated a destination, the "target location" used in calculating the required power amount is set at the destination, for example. When the user has not designated a destination, the "target location" is set at a predetermined location (for example, the user's home or the like). It should be noted that there may be provided a function of allowing the user to adjust the calculated possible power-supplying amount Eout.

Next, the power-supplying permitted vehicle transmits, to server 300, the power-supplying permission information including the vehicle ID, current location Pf, and possible power-supplying amount Eout (step S14).

Turning back to FIG. 6, in order to request to receive power from another vehicle, the power-receiving requesting vehicle transmits power-receiving request information to server 300 (step S20). The power-receiving request information includes information such as a vehicle ID for specifying the power-receiving requesting vehicle, a current location Pc of the power-receiving requesting vehicle, and a power amount (hereinafter, also referred to as "requested power-receiving amount") Ereq requested to be received from another vehicle.

Figure 8:
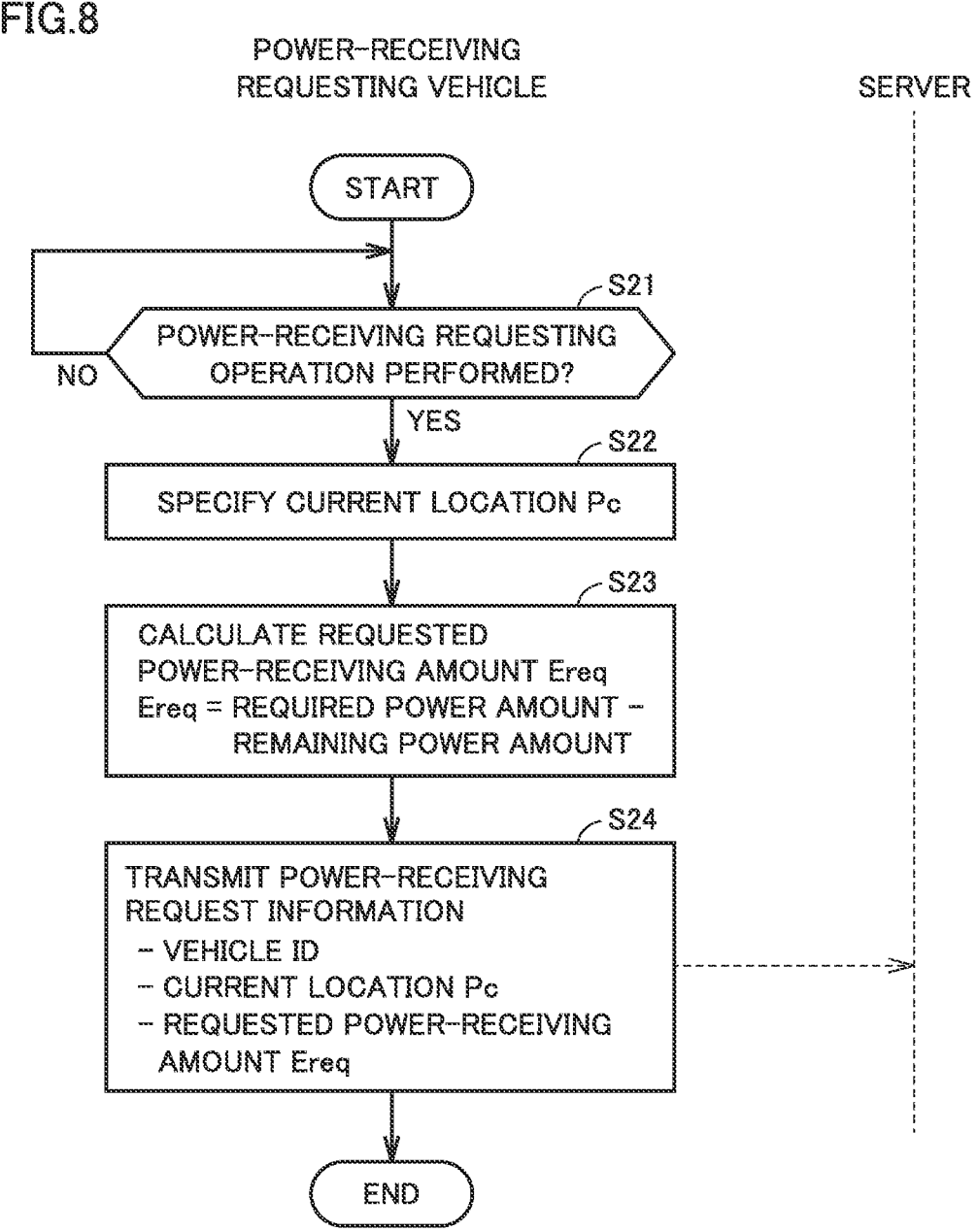
FIG. 8 is a first flowchart showing an exemplary detailed procedure of a process in which the power-receiving requesting vehicle transmits power-receiving request information to the server.

FIG. 8 is a flowchart showing an exemplary detailed procedure of the process (step S20 of FIG. 6) in which the power-receiving requesting vehicle transmits the power-receiving request information to server 300.

The power-receiving requesting vehicle determines whether or not a power-receiving requesting operation is performed by the user (step S21). For example, when the user of the power-receiving requesting vehicle determines that the power amount will be insufficient, the user can input, into input interface 172, an operation for starting inter-vehicle charging service, thereby performing the power-receiving requesting operation. When no power-receiving requesting operation is performed (NO in step S21), the power-receiving requesting vehicle returns the process to step S21.

When a power-receiving requesting operation is performed (YES in step S21), the power-receiving requesting vehicle specifies current location Pc of the power-receiving requesting vehicle using GPS of location detector 178 (step S22).

Next, the power-receiving requesting vehicle calculates requested power-receiving amount Ereq (step S23). For example, the power-receiving requesting vehicle employs a known method to calculate a required power amount that is required to travel a distance from current location Pc to a target location, and calculates, as requested power-receiving amount Ereq, a value obtained by subtracting a power amount (remaining power amount) stored in power storage device 110 from the calculated required power amount. When the user has designated a destination, the "target location" used in calculating the required power amount is set at the destination, for example. When the user has not designated a destination, the "target location" is set at a predetermined location (for example, the user's home or the like). It should be noted that there may be provided a function of allowing the user to adjust the calculated requested power-receiving amount Ereq.

Next, the power-receiving requesting vehicle transmits, to server 300, the power-receiving request information including the vehicle ID, current location Pc, and requested power-receiving amount Ereq (step S24).

Turning back to FIG. 6, when server 300 receives the power-receiving request information from the power-receiving requesting vehicle, server 300 performs a process (hereinafter, also simply referred to as "matching process") for setting the power-receiving requesting vehicle as a candidate power-receiving vehicle and setting a candidate power-supplying vehicle suitable for the candidate power-receiving vehicle so as to match the vehicles (step S100).

It should be noted that for simplicity of explanation, the following describes a case where one candidate power-receiving vehicle and one candidate power-supplying vehicle are matched through the matching process; however, a combination of vehicles to be matched is not limited to this. For example, two or more candidate power-supplying vehicles may be matched to one candidate power-receiving vehicle.

In the matching process, based on the power-receiving request information received from the candidate power-receiving vehicle and the respective pieces of stored information of a plurality of power-supplying permitted vehicles in storage 320, server 300 sets a vehicle suitable to supply power to the candidate power-receiving vehicle, from the plurality of power-supplying permitted vehicles, and sets the vehicle as a candidate power-supplying vehicle. Then, using each current location of the candidate power-receiving vehicle and the candidate power-supplying vehicle and the map information stored in storage 320, server 300 sets a candidate (hereinafter, also referred to as "candidate gathering location") of a location at which the candidate power-receiving vehicle and the candidate power-supplying vehicle will be gathered to perform inter-vehicle charging. Then, server 300 makes an inquiry to the set candidate power-supplying vehicle as to whether to approve the matching. The candidate power-supplying vehicle having received this inquiry makes a response to server 300 as to whether to approve the matching (step S15).

When server 300 receives, from the candidate power-supplying vehicle, a response indicating that the matching is approved, the matching of the candidate power-supplying vehicle and the candidate power-receiving vehicle is confirmed. Then, server 300 notifies, to the matched vehicles, the respective pieces of information of the matched vehicles and the gathering location.

The candidate power-receiving vehicle having received the notification from server 300 causes the content of the received notification to be presented on display 174 (step S26). Similarly, the power-supplying permitted vehicle having received the notification from server 300 causes the content of the received notification to be presented on display 174 (step S16). Accordingly, the user of each vehicle can check the matched counterpart vehicle and the gathering location.

Figure 9:
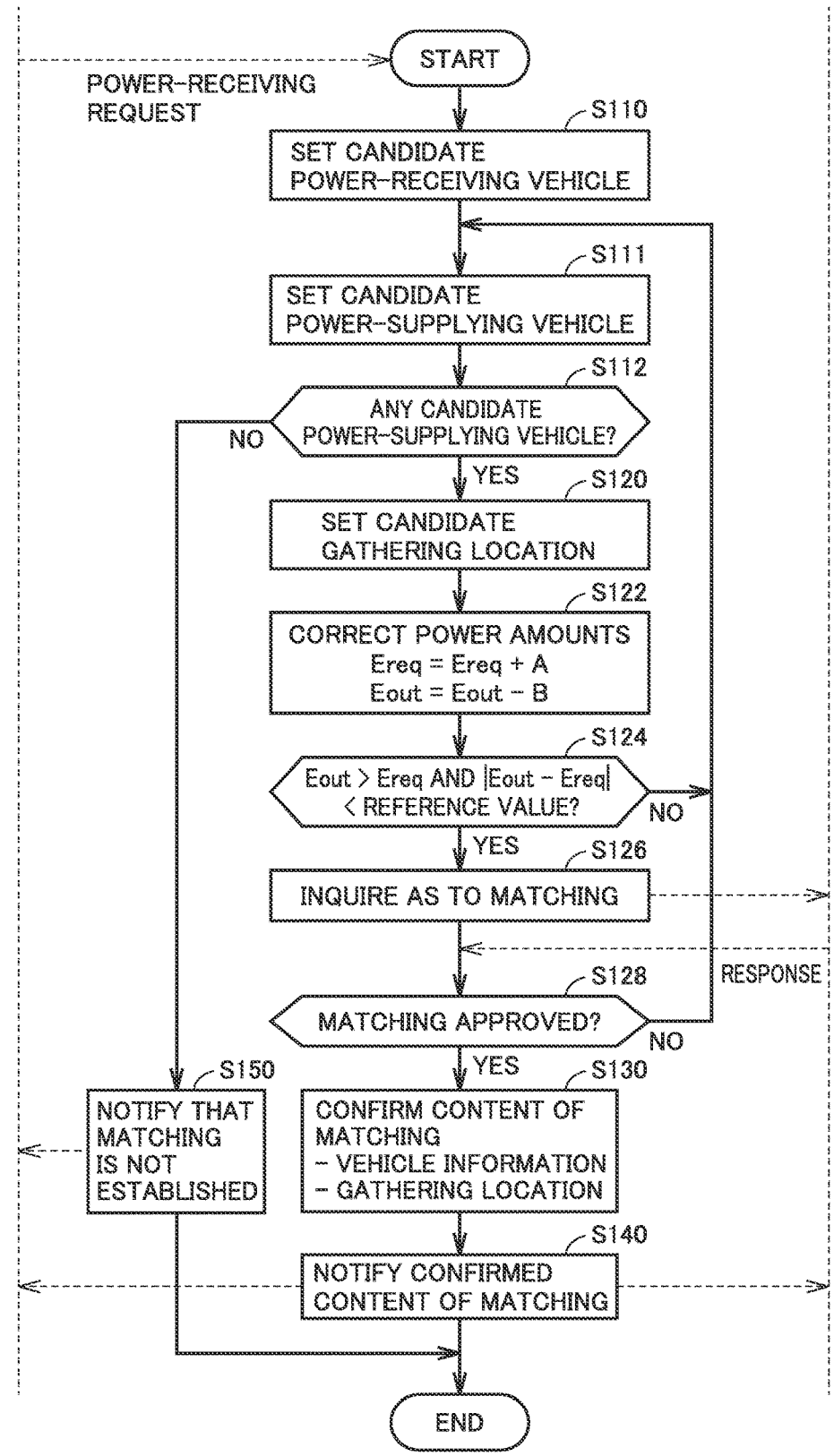
FIG. 9 is a first flowchart showing an exemplary detailed procedure of a matching process performed by the server.

FIG. 9 is a flowchart showing an exemplary detailed procedure of the matching process (step S100 of FIG. 6) performed by server 300. Server 300 is triggered to start the process of this flowchart by receiving the power-receiving request information from the power-receiving requesting vehicle.

First, server 300 sets, as a candidate power-receiving vehicle, the power-receiving requesting vehicle specified by the power-receiving request information (S110).

Next, server 300 performs a process for setting a candidate power-supplying vehicle, based on the power-receiving request information received from the candidate power-receiving vehicle and respective pieces of stored power-supplying permission information of a plurality of power-supplying permitted vehicles in storage 320 (step S111).

For example, server 300 sets, as the candidate power-supplying vehicle, a power-supplying permitted vehicle whose distance from the candidate power-receiving vehicle is less than a threshold value Lth and whose possible power-supplying amount Eout is the closest to requested power-receiving amount Ereq of the candidate power-receiving vehicle.

FIG. 10 illustrates an exemplary method of setting a candidate power-supplying vehicle. In a case shown in FIG. 10, it is illustratively shown that there are four power-supplying permitted vehicles A to D in a range in which a distance from the candidate power-receiving vehicle is less than threshold value Lth. It should be noted that respective distances L1, L2, L3, and L4 between power-supplying permitted vehicles A to D and the candidate power-receiving vehicle satisfy the following relation: L1<L2<L3<L4<Lth.

A power difference between possible power-supplying amount Eout of power-supplying permitted vehicle B and requested power-receiving amount Ereq is "0", which is the smallest. A power difference between possible power-supplying amount Eout of power-supplying permitted vehicle A and requested power-receiving amount Ereq and a power difference between possible power-supplying amount Eout of power-supplying permitted vehicle C and requested power-receiving amount Ereq are both "α" (α>0), which is the next smallest to that of power-supplying permitted vehicle B. A power difference between possible power-supplying amount Eout of power-supplying permitted vehicle D and requested power-receiving amount Ereq is "2α", which is the largest.

As shown in FIG. 10, server 300 provides higher priorities, in the order from the vehicle with the smallest power difference, to the four power-supplying permitted vehicles A to D existing in the range in which the distance from the candidate power-receiving vehicle is less than threshold value Lth. When the power differences are the same, higher priorities are provided in the order from a vehicle having a shorter distance from the candidate power-receiving vehicle. In the case shown in FIG. 10, higher priorities are provided in the order of power-supplying permitted vehicle B, power-supplying permitted vehicle A, power-supplying permitted vehicle C, and power-supplying permitted vehicle D.

Server 300 sets a candidate power-supplying vehicle in accordance with the provided priorities. In the case shown in FIG. 10, power-supplying permitted vehicle B having the highest priority is set as the candidate power-supplying vehicle. When matching to power-supplying permitted vehicle B is not established, power-supplying permitted vehicle A having the next highest priority is set as the candidate power-supplying vehicle.

It should be noted that when matchings to all of the four power-supplying permitted vehicles A to D are not established, no candidate power-supplying vehicle is set. Also, no candidate power-supplying vehicle is set when there is no power-supplying permitted vehicle in the range in which the distance from the candidate power-receiving vehicle is less than threshold value Lth.

Turning back to FIG. 9, server 300 determines whether or not a candidate power-supplying vehicle has been set by the process of step S111 (step S112). When no candidate power-supplying vehicle has been set (NO in step S112), server 300 notifies the candidate power-receiving vehicle that the matching is not established (step S150).

On the other hand, when a candidate power-supplying vehicle has been set (YES in step S112), server 300 sets a candidate gathering location using current location Pc of the candidate power-receiving vehicle, current location Pf of the candidate power-supplying vehicle, and map information stored in storage 320 (step S120).

When actually performing inter-vehicle charging, a space to park the two vehicles with certain room is needed. Hence, server 300 may make reference to the map information stored in storage 320 to set, as the candidate gathering location, a location different from the respective locations of the candidate power-receiving vehicle and the candidate power-supplying vehicle (for example, public parking areas of a shopping center, a movie theater, and a theme park, and the like).

When the candidate gathering location is set, server 300 corrects requested power-receiving amount Ereq of the candidate power-receiving vehicle and possible power-supplying amount Eout of the candidate power-supplying vehicle in consideration of a power amount required by each of the candidate power-receiving vehicle and the candidate power-supplying vehicle to move to the candidate gathering location (step S122). Specifically, server 300 estimates the power amount required by the candidate power-supplying vehicle to move to the candidate gathering location, and employs, as corrected possible power-supplying amount Eout, a value obtained by subtracting the estimated power amount from possible power-supplying amount Eout. Moreover, server 300 estimates a power amount required by the candidate power-receiving vehicle to move to the candidate gathering location, and employs, as corrected requested power-receiving amount Ereq, a value obtained by adding the estimated power amount to requested power-receiving amount Ereq.

Next, server 300 determines whether or not corrected requested power-receiving amount Ereq and corrected possible power-supplying amount Eout satisfy a matching requirement (step S124). Specifically, it is determined whether or not corrected possible power-supplying amount Eout is larger than corrected requested power-receiving amount Ereq and a difference therebetween (=|Eout−Ereq|) is less than a reference value.

When the matching requirement is not satisfied (NO in step S124), server 300 returns the process to step S111 and performs the process for setting a candidate power-supplying vehicle again. On this occasion, server 300 sets a power-supplying permitted vehicle having the next largest priority as a candidate power-supplying vehicle, while excluding the foregoing candidate power-supplying vehicle determined as not satisfying the matching requirement (see FIG. 10).

When the matching requirement is satisfied (YES in step S124), server 300 transmits information such as the information of the candidate power-receiving vehicle and the candidate gathering location to the candidate power-supplying vehicle, so as to make an inquiry as to whether or not the matching to the candidate power-receiving vehicle is approved (step S126).

Next, server 300 determines whether or not a response indicating that the matching is approved is received from the candidate power-supplying vehicle (step S128).

When a response from the candidate power-supplying vehicle is received to indicate that the matching is rejected (NO in step S128), server 300 returns the process to step S111 and performs the process for setting a candidate power-supplying vehicle again. On this occasion, a power-supplying permitted vehicle having the next largest priority is set as a candidate power-supplying vehicle, while excluding the foregoing candidate power-supplying vehicle having made the response indicating that the matching is rejected (see FIG. 10).

When there is a response from the candidate power-supplying vehicle to indicate that the matching is approved (YES in step S128), server 300 confirms the matching of the candidate power-receiving vehicle and the candidate power-supplying vehicle (step S130). Specifically, the candidate power-receiving vehicle and the candidate power-supplying vehicle are confirmed as vehicles that are subjects of the matching, and the candidate gathering location is confirmed as a gathering location of the vehicles.

Then, server 300 notifies, to both the matched vehicles, the respective pieces of information of the vehicles, the gathering location, and the like (step S140).

As described above, in the matching process (see S110 to S130 of FIG. 9), server 300 according to the present embodiment determines vehicles to be matched and a gathering location of the vehicles in consideration of current location Pf and possible power-supplying amount Eout (power-supplying permission information) of the candidate power-supplying vehicle and current location Pc and requested power-receiving amount Ereq (power-receiving request information) of the candidate power-receiving vehicle. Accordingly, the server can determine, as the gathering location, a location by which a mismatch in power amount between the matched vehicles can be suppressed. Further, server 300 transmits the determined gathering location to the matched vehicles (see step S140 of FIG. 9). Accordingly, the users of both the vehicles can be notified of the gathering location by which the mismatch in power amount between the power-supplying vehicle and the power-receiving vehicle can be suppressed.

Particularly, in the matching process, server 300 according to the present embodiment sets the candidate gathering location for both the vehicles using current location Pf of the candidate power-supplying vehicle, current location Pc of the candidate power-receiving vehicle, and the map information (step S120 of FIG. 9), and corrects requested power-receiving amount Ereq and possible power-supplying amount Eout in consideration of the required power amounts required by both the vehicles to move to the candidate gathering location (step S122 of FIG. 9). Moreover, in consideration of corrected requested power-receiving amount Ereq and possible power-supplying amount Eout, server 300 determines whether to match the candidate power-supplying vehicle and the candidate power-receiving vehicle (step S124 of FIG. 9). Hence, the mismatch in power amount can be suppressed appropriately from arising due to the matched vehicles moving to the gathering location.

Further, the candidate power-supplying vehicle transmits, to server 300 as possible power-supplying amount Eout, the value obtained by subtracting the power amount required to move from current location Pf of the candidate power-supplying vehicle to the target location from the remaining power amount (stored power amount) of power storage device 110 of the candidate power-supplying vehicle. Moreover, the candidate power-receiving vehicle transmits, to server 300 as requested power-receiving amount Ereq, the value obtained by subtracting the remaining power amount (stored power amount) of power storage device 110 of the candidate power-receiving vehicle from the power amount required to move from current location Pc of the candidate power-receiving vehicle to the target location. Accordingly, in the matching process, server 300 can determine whether to match the candidate power-supplying vehicle and the candidate power-receiving vehicle in consideration of the power amount required by the candidate power-supplying vehicle to move to the target location and the power amount required by the power-receiving vehicle to move to the target location of the power-receiving vehicle. Accordingly, after exchanging power between the matched vehicles, respective power amounts required by the vehicles to move to the respective target locations can be appropriately secured.

<Modification 1>

In the above-described first embodiment, it has been illustratively described that each vehicle 100 is provided with communicator 180 configured to be communicatively connected to communication network 400 directly (see FIG. 4).

However, the communicative connection between each vehicle 100 and communication network 400 may be made using a mobile terminal held by the user of each vehicle 100.

Figure 11:
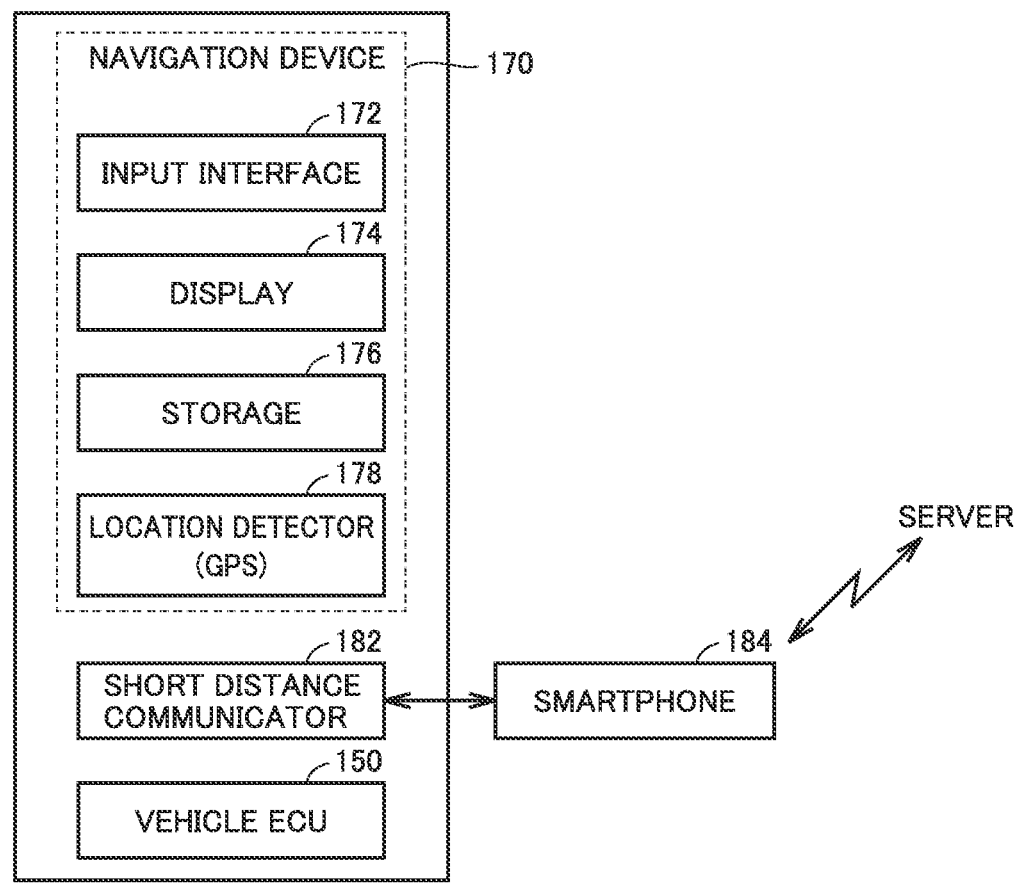
FIG. 11 is a second diagram showing an exemplary configuration of the vehicle.

FIG. 11 shows an exemplary configuration of a vehicle 100-1 according to a modification 1. Instead of communicator 180 described above, this vehicle 100-1 includes a short distance communicator 182 configured to make a short distance communication with a mobile terminal such as a smartphone 184. Smartphone 184 has a function of communicatively connecting to communication network 400 directly. Hence, via smartphone 184, vehicle 100-1 can communicate with server 300 connected to communication network 400.

In recent years, such short distance communicators 182 are mounted in many vehicles as standard specification. Therefore, vehicle 100-1 can communicate with server 300 via short distance communicator 182 and smartphone 184 without newly providing communicator 180 configured to be communicatively connected to communication network 400 directly.

<Modification 2>

In the above-described first embodiment, it has been illustratively described that the power-supplying vehicle is an electric vehicle (EV) that travels using electric power. However, the power-supplying vehicle may be a plug-in hybrid vehicle that can travel using electric power as well as fuel (such as gasoline) other than electric power.

When power-supplying vehicle 100B is a plug-in hybrid vehicle and the user permits traveling mainly using fuel (such as gasoline) instead of electric power, possible power-supplying amount Eout can be set at a larger value.

When setting possible power-supplying amount Eout at a value as large as possible, it is determined whether or not it is possible to travel to the target location only using the fuel. When it is possible to travel to the target location only using the fuel, the remaining power amount of power storage device 110 can be set as possible power-supplying amount Eout without modification. On the other hand, when it is impossible to travel to the target location only using the fuel, a power amount corresponding to insufficiency in the amount of fuel can be calculated, and a value obtained by subtracting the calculated power amount from the remaining power amount of power storage device 110 can be set as possible power-supplying amount Eout.

<Modification 3>

In the above-described first embodiment, there may be newly provided a process in which each user of the matched vehicles evaluates the result of matching by server 300 and the evaluation result is returned to server 300.

Figure 12:
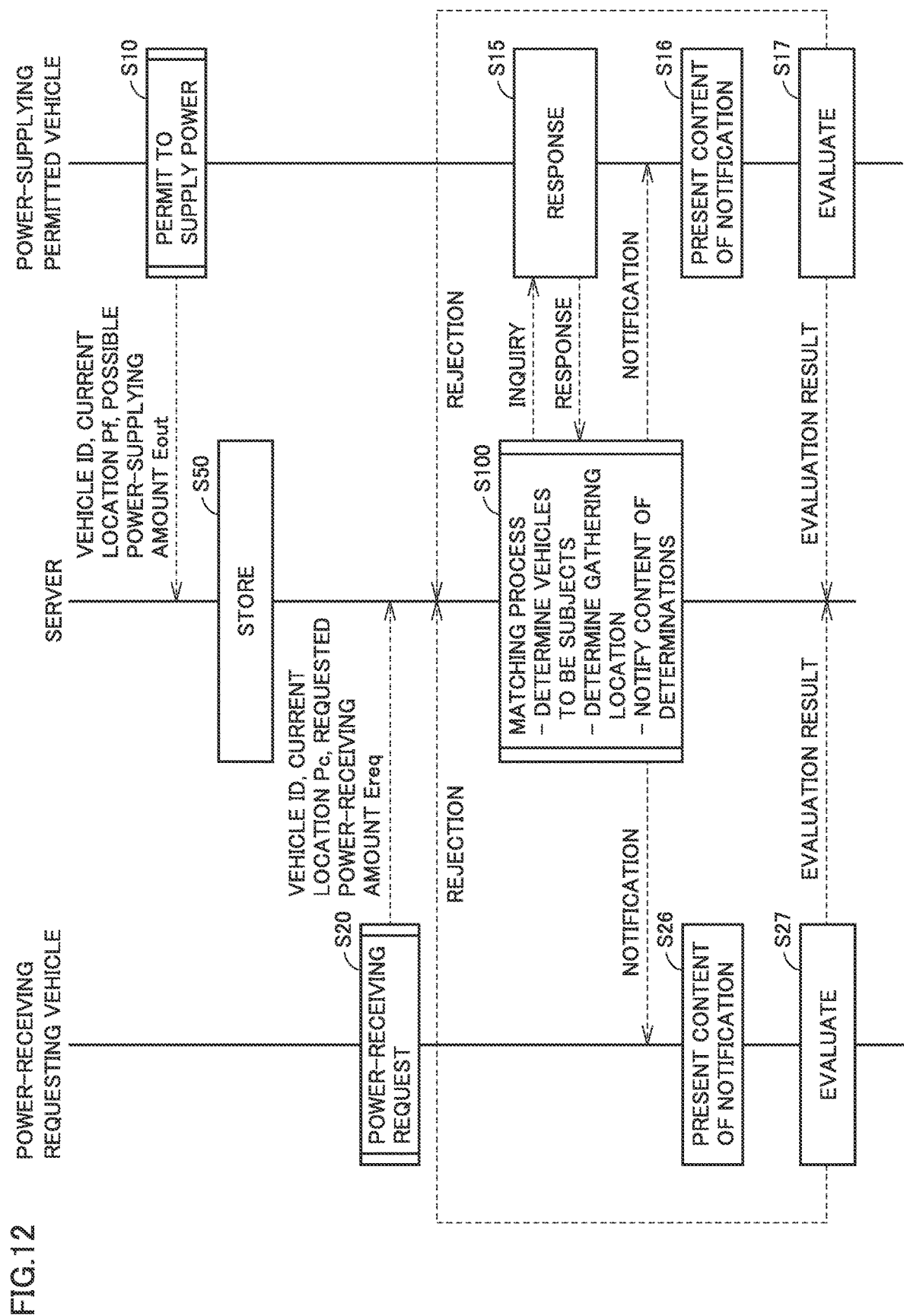
FIG. 12 is a second sequence diagram showing an exemplary process performed among the power-receiving requesting vehicle, the server, and the power-supplying permitted vehicle.

FIG. 12 is a sequence diagram showing an exemplary process performed among a power-receiving requesting vehicle, server 300, and a power-supplying permitted vehicle included in an information providing system 10 according to a modification 3. The sequence diagram shown in FIG. 12 is obtained by adding a process (step S27) for evaluating the power-receiving requesting vehicle and a process (step S17) for evaluating the power-supplying permitted vehicle to the above-described sequence diagram shown in FIG. 6.

After performing the process (step S26) for presenting the content of the matching notification received from server 300 on display 174, the power-receiving requesting vehicle (candidate power-receiving vehicle) receives an evaluation of the user for the matching result, and transmits the evaluation result to server 300 (step S27). Similarly, after performing the process (step S16) for presenting the content of the matching notification received from server 300 on display 174, the power-supplying permitted vehicle (candidate power-supplying vehicle) receives an evaluation of the user for the matching result, and transmits the evaluation result to server 300 (step S17). Accordingly, server 300 can perform a matching process based on the evaluation results of the users in future.

Moreover, when the gathering location of the matched vehicles is far away and the matching result cannot be accepted due to time restriction or the like, the user of each vehicle may transmit, to server 300, an indication that the matching is rejected in, for example, the process (step S17, S27) for inputting the evaluation of the user. When one of the users rejects the matching, server 300 may perform the matching process (step S100) again while excluding the rejected matching content (matched counterpart vehicle; gathering location).

Moreover, server 300 may increase a successful matching rate by relatively decreasing an evaluation of a vehicle highly frequently rejected in matching such that the vehicle is less likely to be a subject of matching. Moreover, there may be provided a step in which the users of the vehicles evaluate each other after being actually matched and performing supply of power and charging between the vehicles.

<Modification 4>

In the above-described first embodiment, it has been illustratively described that server 300 notifies the gathering location to the matched vehicles.

However, the information transmitted by server 300 to the matched vehicles is not limited only to the gathering location. For example, in addition to the gathering location, server 300 may transmit, to the matched vehicles, a distance from each vehicle to the gathering location, a time required by each vehicle to move to the gathering location, a gathering time, possible power-supplying amount Eout, requested power-receiving amount Ereq, information of the counterpart matched vehicle (such as contact information, vehicle type, and the like).

<Modification 5>

Although a reward for supply of power is not described in particular in the above-described first embodiment, the user of the power-supplying vehicle may obtain a reward from the user of the power-receiving vehicle. In that case, a condition for a rewarding fee may be added in a condition of the matching. For example, the power-supplying permitted vehicle may transmit, to server 300, a rewarding fee desired for supply of power, the candidate power-receiving vehicle may transmit a rewarding fee payable for reception of power to server 300, and server 300 may perform the matching process in consideration of these rewarding fees.

Second Embodiment

In the above-described first embodiment, it is assumed that both the matched vehicles are vehicles that are being driven by the users (hereinafter, also referred to as "user-driven vehicle").

However, the vehicles to be subjects of the matching may include a vehicle that is performing automated driving in absence of a driver (hereinafter, also referred to as "automated-driving vehicle"). For example, both the matched vehicles may be automated-driving vehicles. Moreover, one of the matched vehicles may be a user-driven vehicle and the other of the matched vehicles may be an automated-driving vehicle.

Thus, when the automated-driving vehicle is included in the vehicles to be subjects of the matching, each vehicle may transmit, to server 300, a flag (hereinafter, also referred to as "automated driving flag") indicating whether or not automated driving is being performed. Accordingly, server 300 can perform the matching process in consideration of whether or not each vehicle is performing automated driving.

For example, server 300 can match a power-supplying vehicle that is performing automated driving to a power-receiving vehicle that is being driven by a user. In this way, the automated-driving vehicle, which has a larger degree of freedom in operation, can be dispatched to supply power to the user-driven vehicle, which has a smaller degree of freedom in operation.

Figure 13:
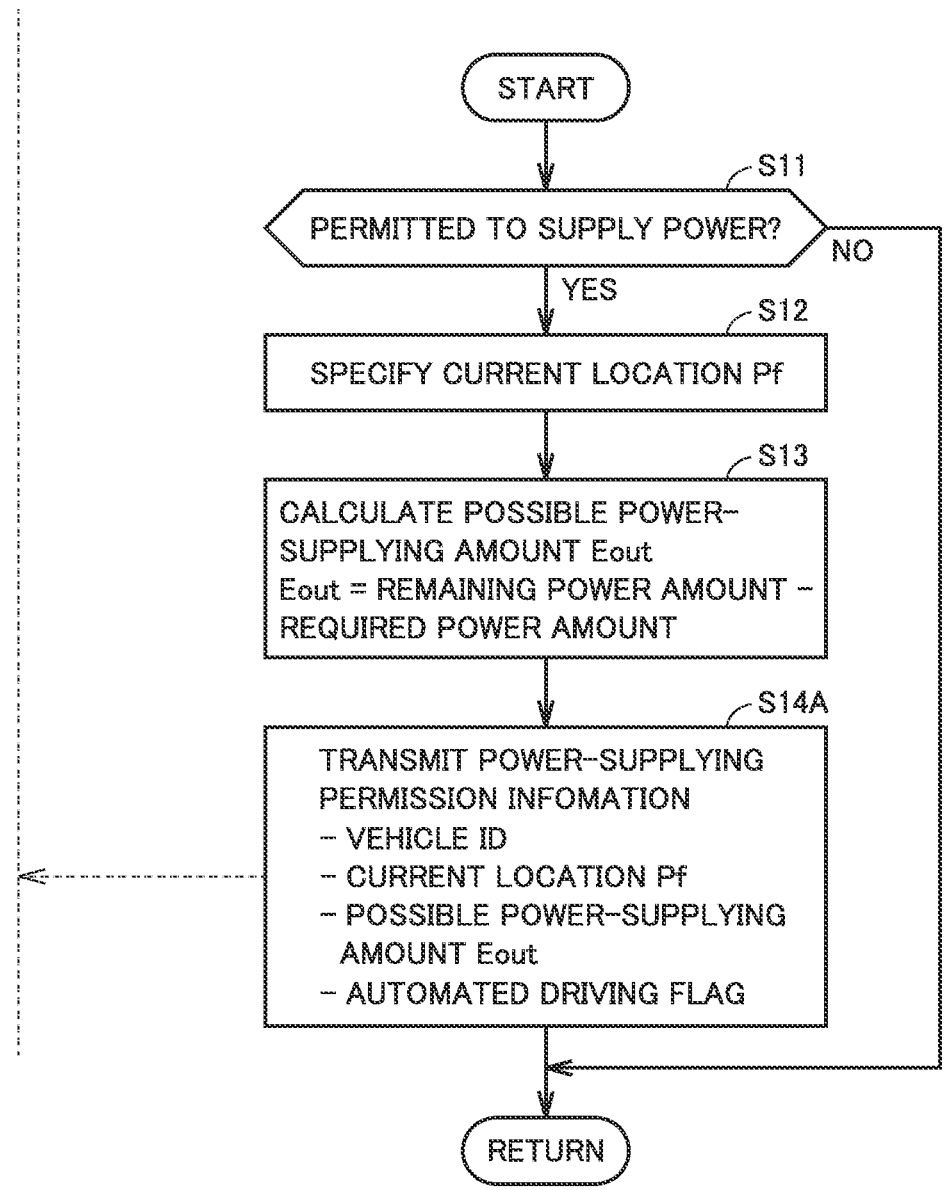
FIG. 13 is a second flowchart showing an exemplary detailed procedure of a process in which the power-supplying permitted vehicle transmits power-supplying permission information to the server.

FIG. 13 is a flowchart showing an exemplary detailed procedure of a process in which a power-supplying permitted vehicle according to a second embodiment transmits power-supplying permission information to server 300. This flowchart is obtained by changing step S14 of the flowchart of FIG. 7 to a step S14A. The other steps (steps given the same numerals as those of the steps in FIG. 7) have been already described and therefore will not be described repeatedly here in detail.

The power-supplying permitted vehicle transmits, to server 300, the power-supplying permission information including the automated driving flag in addition to the vehicle ID, current location Pf, and possible power-supplying amount Eout of the power-supplying permitted vehicle (step S14A).

FIG. 14 is a flowchart showing an exemplary detailed procedure of a process in which a power-receiving requesting vehicle according to the second embodiment transmits power-receiving request information to server 300. This flowchart is obtained by changing step S24 of the flowchart of FIG. 8 to a step S24A. The other steps (steps given the same numerals as those of the steps in FIG. 8) have been already described and therefore will not be described repeatedly here in detail.

The power-receiving requesting vehicle transmits, to server 300, the power-receiving request information including the automated driving flag in addition to the vehicle ID, current location Pc, and requested power-receiving amount Ereq of the power-receiving requesting vehicle (step S24A).

FIG. 15 is a flowchart showing an exemplary detailed procedure of a matching process performed by server 300 according to the second embodiment. This flowchart is obtained by changing step S111 of the flowchart of FIG. 9 to a step S111A. The other steps (steps given the same numerals as those of the steps in FIG. 9) have been already described and therefore will not be described repeatedly here in detail.

After setting the candidate power-receiving vehicle (S110), server 300 sets the candidate power-supplying vehicle based on the power-receiving request information received from the candidate power-receiving vehicle and the respective pieces of the stored information of the plurality of power-supplying permitted vehicles in storage 320 (step S111A).

On this occasion, server 300 sets the candidate power-supplying vehicle while making reference to the automated driving flag of the candidate power-receiving vehicle and the automated driving flag of the power-supplying permitted vehicle.

For example, server 300 makes reference to the automated driving flag included in the power-receiving request information so as to determine whether or not the candidate power-receiving vehicle is performing automated driving. When the candidate power-receiving vehicle is not performing automated driving (i.e., when candidate power-receiving vehicle is being driven by the user), server 300 makes reference to the automated driving flags to extract a power-supplying permitted vehicle that is performing automated driving from the plurality of power-supplying permitted vehicles stored in storage 320, and sets, as the candidate power-supplying vehicle, the extracted power-supplying permitted vehicle that is performing automated driving. Accordingly, server 300 can match the power-receiving vehicle not determined to be performing automated driving in accordance with the automated driving flag, and the power-supplying vehicle determined to be performing automated driving in accordance with the automated driving flag. As a result, the candidate power-supplying vehicle that is performing automated driving and that has a larger degree of freedom in operation can be matched to the power-receiving requesting vehicle that is being driven by the user and that has a smaller degree of freedom in operation.

As described above, in the second embodiment, each of the plurality of power-receiving vehicles and each of the plurality of power-supplying vehicles can transmit, to server 300, the automated driving flags, each of which indicates whether or not automated driving is being performed. Server 300 includes, as the subject of the matching process, the vehicle determined to be performing automated driving in accordance with the automated driving flag. Accordingly, server 300 can perform the matching process in consideration of whether or not each vehicle is performing automated driving.

It should be noted that when the matched candidate power-supplying vehicle is an automated-driving vehicle, server 300 communicates with the candidate power-supplying vehicle that is performing automated driving, so as to control the candidate power-supplying vehicle that is performing the automated driving to head for the gathering location.

In this case, for example, when the candidate power-supplying vehicle that is performing automated driving is on its way to pick up a user, server 300 may make an inquiry, as to whether to supply power, to a mobile terminal held by the user of the candidate power-supplying vehicle that is performing automated driving. When the supply of power is approved, server 300 may control the automated driving of the candidate power-supplying vehicle to head for the gathering location before picking up the user.

Moreover, when the candidate power-supplying vehicle is performing automated driving without the user onboard after bringing the user to a destination, server 300 may control the automated driving of the candidate power-supplying vehicle to head for the gathering location unconditionally without making an inquiry to the user.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An information providing system comprising:
   a server;
   a plurality of power-supplying vehicles configured to transmit respective pieces of first information to the server, the respective pieces of first information indicating respective current locations and respective possible power-supplying amounts of the plurality of power-supplying vehicles; and
   a plurality of power-receiving vehicles configured to transmit respective pieces of second information to the server, the respective pieces of second information indicating respective current locations and respective requested power-receiving amounts of the plurality of power-receiving vehicles,
   the server being configured to
   perform a matching process for matching at least one of the plurality of power-supplying vehicles and at least one of the plurality of power-receiving vehicles using the respective pieces of first information and the respective pieces of second information and for determining a gathering location of the matched vehicles, and
   transmit information indicating the determined gathering location to the matched vehicles,
   set at least one of the plurality of power-supplying vehicles as a candidate power-supplying vehicle, and
   set at least one of the plurality of power-receiving vehicles as a candidate power-receiving vehicle,
   set a candidate gathering location of the candidate power-supplying vehicle and the candidate power-receiving vehicle,
   determine whether to match the candidate power-supplying vehicle and the candidate power-receiving vehicle, using
   a value obtained by subtracting a power amount required by the candidate power-supplying vehicle to move to the candidate gathering location from a possible power-supplying amount of the candidate power-supplying vehicle, and
   a value obtained by adding a power amount required by the candidate power-receiving vehicle to move to the candidate gathering location to a requested power-receiving amount of the candidate power-receiving vehicle.

2. The information providing system according to claim 1, wherein in the matching process, the server is configured to
   set the candidate gathering location of the candidate power-supplying vehicle and the candidate power-receiving vehicle using a current location of the candidate power-supplying vehicle, a current location of the candidate power-receiving vehicle, and map information.

3. The information providing system according to claim 1, wherein
   each of the plurality of power-supplying vehicles and the plurality of power-receiving vehicles includes a power storage device,
   each power-supplying vehicle is configured to transmit, to the server as the possible power-supplying amount, a value obtained by subtracting a power amount required to move from a current location of the power-supplying vehicle to a target location from a stored power amount of the power storage device of the power-supplying vehicle, and
   each power-receiving vehicle is configured to transmit, to the server as the requested power-receiving amount, a value obtained by subtracting a stored power amount of the power storage device of the power-receiving vehicle from a power amount required to move from a current location of the power-receiving vehicle to a target location.

4. The information providing system according to claim 1, wherein
   each of the plurality of power-supplying vehicles and the plurality of power-receiving vehicles is configured to transmit to the server an automated driving flag indicating whether or not automated driving is being performed, and
   in the matching process, the server is configured to include, as a subject of the matching process, a vehicle determined to be performing automated driving in accordance with a corresponding automated driving flag.

5. The information providing system according to claim 4, wherein in the matching process, the server is configured to match a power-receiving vehicle not determined to be performing automated driving in accordance with a corresponding automated driving flag, and a power-supplying vehicle determined to be performing automated driving in accordance with a corresponding automated driving flag.

6. A server configured to communicate with a plurality of power-supplying vehicles and a plurality of power-receiving vehicles, the server comprising:

a communicator configured to obtain respective pieces of first information from the plurality of power-supplying vehicles and obtain respective pieces of second information from the plurality of power-receiving vehicles, the respective pieces of first information indicating respective current locations and respective possible power-supplying amounts of the plurality of power-supplying vehicles, the respective pieces of second information indicating respective current locations and respective requested power-receiving amounts of the plurality of power-receiving vehicles; and a controller connected to the communicator, the controller being configured to perform a matching process for matching at least one of the plurality of power-supplying vehicles and at least one of the plurality of power-receiving vehicles using the respective pieces of first information and the respective pieces of second information and for determining a gathering location of the matched vehicles, and transmit information indicating the determined gathering location to the matched vehicles, set at least one of the plurality of power-supplying vehicles as a candidate power-supplying vehicle, and set at least one of the plurality of power-receiving vehicles as a candidate power-receiving vehicle, set a candidate gathering location of the candidate power-supplying vehicle and the candidate power-receiving vehicle, determine whether to match the candidate power-supplying vehicle and the candidate power-receiving vehicle, using a value obtained by subtracting a power amount required by the candidate power-supplying vehicle to move to the candidate gathering location from a possible power-supplying amount of the candidate power-supplying vehicle, and a value obtained by adding a power amount required by the candidate power-receiving vehicle to move to the candidate gathering location to a requested power-receiving amount of the candidate power-receiving vehicle.

7. An information providing method performed by an information providing system including a plurality of power-supplying vehicles, a plurality of power-receiving vehicles, and a server configured to communicate with the plurality of power-supplying vehicles and the plurality of power-receiving vehicles, the information providing method comprising:

obtaining respective pieces of first information from the plurality of power-supplying vehicles, the respective pieces of first information indicating respective current locations and respective possible power-supplying amounts of the plurality of power-supplying vehicles;

obtaining respective pieces of second information from the plurality of power-receiving vehicles, the respective pieces of second information indicating respective current locations and respective requested power-receiving amounts of the plurality of power-receiving vehicles;

performing a matching process for matching at least one of the plurality of power-supplying vehicles and at least one of the plurality of power-receiving vehicles using the respective pieces of first information and the respective pieces of second information and for determining a gathering location of the matched vehicles; and transmitting information indicating the determined gathering location to the matched vehicles, setting at least one of the plurality of power-supplying vehicles as a candidate power-supplying vehicle, and set at least one of the plurality of power-receiving vehicles as a candidate power-receiving vehicle, setting a candidate gathering location of the candidate power-supplying vehicle and the candidate power-receiving vehicle, determining whether to match the candidate power-supplying vehicle and the candidate power-receiving vehicle, using obtaining a value by subtracting a power amount required by the candidate power-supplying vehicle to move to the candidate gathering location from a possible power-supplying amount of the candidate power-supplying vehicle, and obtaining a value by adding a power amount required by the candidate power-receiving vehicle to move to the candidate gathering location to a requested power-receiving amount of the candidate power-receiving vehicle.

* * * * *